United States Patent [19]

Juso

[11] 4,226,425
[45] Oct. 7, 1980

[54] NONRECORDED SECTION DETECTION IN AN AUTOMATIC RECORD

[75] Inventor: Hiromi Juso, Gose, Japan

[73] Assignee: Sharp Kabushiki Kaisha, Osaka, Japan

[21] Appl. No.: 946,854

[22] Filed: Sep. 28, 1978

[51] Int. Cl.$^3$ .............................................. G11B 17/06
[52] U.S. Cl. .................................................... 274/15 R
[58] Field of Search ................... 274/15 R, 1 R, 9 RA

[56] References Cited

U.S. PATENT DOCUMENTS

| | | | |
|---|---|---|---|
| 2,056,372 | 10/1936 | Schwartz | 274/15 R X |
| 3,937,903 | 2/1976 | Osann | 274/15 R |

*Primary Examiner*—Charles E. Phillips

*Attorney, Agent, or Firm*—Birch, Stewart, Kolasch & Birch

[57] ABSTRACT

A nonrecorded section detection sensor is mounted on a sensor arm which is rotatable around a shaft, to which a drive mechanism is connected to scan the nonrecorded section detection sensor above a disc. A slit plate is fixed to the shaft to detect the rotation of the shaft, whereby the address of a nonrecorded section provided between two adjacent tracks recorded on the disc is detected. Another slit plate is fixed to a tonearm drive shaft to detect a current address of a pickup cartridge mounted on a tonearm. A control circuit functions to locate the pickup cartridge at a beginning position of a selected track through the use of information related to the addresses of the nonrecorded section and the pickup cartridge.

14 Claims, 4 Drawing Figures

NONRECORDED SECTION DETECTION IN AN AUTOMATIC RECORD

BACKGROUND AND SUMMARY OF THE INVENTION

The present invention relates to an automatic record player which responds to a nonrecorded section provided between two adjacent tracks recorded on a disc.

An automatic record player has been developed, which responds to a nonrecorded section provided between two adjacent tracks recorded on a disc. The conventional automatic record player such as "Accutrac 4000" manufactured by AUDIO DYNAMICS CORPORATION has a nonrecorded section detection sensor disposed within a pickup cartridge mounted on a tonearm. Since the nonrecorded section detection sensor is incorporated in the pickup cartridge, the pickup cartridge is not interchangeable with a commercially available pickup cartridge.

Accordingly, an object of the present invention is to provide an automatic record player including a nonrecorded section detection sensor which is separated from a pickup cartridge.

Another object of the present invention is to provide an automatic record player including a nonrecorded section detection sensor mounted on a sensor arm separated from a tonearm.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, a nonrecorded section detection sensor including a light emitting element and a light responsive element is mounted on a sensor arm. A drive mechanism is associated with the sensor arm to drive the sensor arm in such a manner that the nonrecorded section detection sensor scans a disc surface to detect the nonrecorded section provided between two adjacent tracks. Rotation of the sensor arm is detected by a sensor arm rotation angle detection means to determine an address of the nonrecorded section detected by the nonrecorded section detection sensor.

Rotation of the tonearm is detected by a tonearm rotation angle detection means to determine an address of a current position of the pickup cartridge. The sensor arm rotation angle detection means and the tonearm rotation angle detection means are correlated with each other so that the same address of the nonrecorded section detection sensor and the pickup cartridge corresponds to one portion on the disc.

BRIEF DESCRIPTION OF THE DRAWINGS

The present invention will become more fully understood from the detailed description given hereinbelow and the accompanying drawings are given by way of illustration only, and thus are not limitative of the present invention and wherein.

DESCRIPTION OF THE PREFERRED EMBODIMENTS

Figure 1:
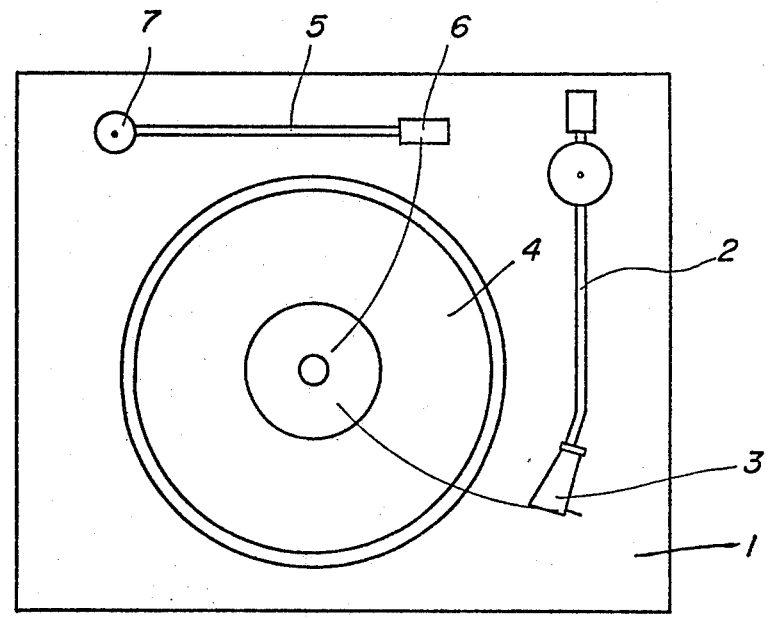
FIG. 1 is a plan view of an embodiment of an automatic record player of the present invention.
Figure 2:
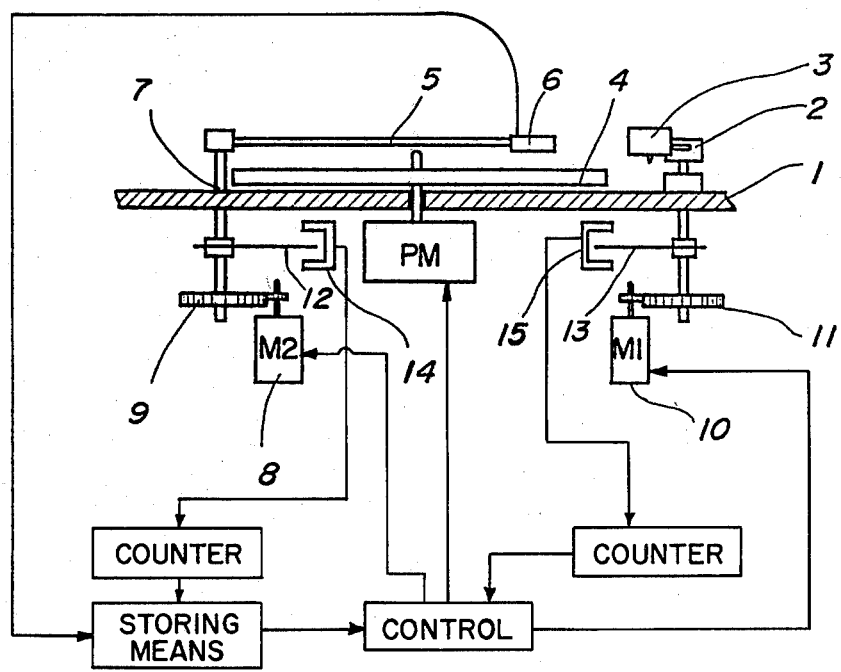
FIG. 2 is a schematic sectional view of the automatic record player of FIG. 1.

FIGS. 1 and 2 show an embodiment of an automatic record player of the present invention.

The automatic record player mainly comprises a player board 1, a tonearm 2 carrying a pickup cartridge 3 mounted thereon, a turntable 4, and a nonrecorded section sensor arm 5. A nonrecorded section detection sensor 6 is mounted on the sensor arm 5 to scan a disc surface mounted on the turntable 4. The nonrecorded section detection sensor 6 includes a light emitting element and a light responsive element responding to a nonrecorded section provided between two adjacent tracks recorded on the disc.

The turntable 4 is driven to rotate at a fixed speed by a turntable drive motor PM. The sensor arm 5 is driven to rotate by a sensor arm drive motor 8 through a drive shaft 7 and a transfer mechanism 9. The tonearm 2 is driven to rotate by a tonearm drive motor 10 through a shaft and a transfer mechanism 11.

A slit plate 12 including a plurality of slits is fixed to the shaft 7 so that the slit plate 12 rotates in unison with the rotation of the sensor arm 5. A slit plate rotation sensor 14 is associated with the slit plate 12. The slit plate rotation sensor 14 includes a light emitting diode and a photo sensitive transistor, whereby the sensor 14 develops a pulse signal in response to rotation of the slit plate 12.

Another slit plate 13 including plural slits formed therein is fixed to the tonearm rotation shaft so that the slit plate 13 rotates in unison with the roration of the tonearm rotation shaft. Another slit plate rotation sensor 15 is associated with the slit plate 13. The slit plate rotation sensor 15 comprises a light emitting diode and a photo sensitive transistor, whereby the sensor 15 develops a pulse signal responsive to rotation of the slit plate 13.

A counter means is connected to the slit plate rotation sensor 15 to count the pulse signal derived therefrom. That is, the counter stores information related to the address of the pickup cartridge. Another counter means is connected to the slit plate rotation sensor 14 to count the pulse signal derived therefrom. That is, the counter stores information related to the address of the nonrecorded section detected by the nonrecorded section detection sensor 6.

More specifically, the addresses of the each nonrecorded sections are memorized in the counter means in the following manner.

| MEMORY NO. | COUNT NO. | NOTES |
| --- | --- | --- |
| 1 | 0100 | nonrecorded section provided before the first track, indicating a disc size |
| 2 | 0183 | nonrecorded section provided between the first and second tracks |
| 3 | 0250 | nonrecorded section |

| MEMORY NO. | COUNT NO. | NOTES |
|---|---|---|
| | | provided between the second and third tracks |
| . | . | . |
| . | . | . |
| . | . | . |
| . | . | . |

The scanning operation of the nonrecorded section detection sensor 6 is first carried out and a control circuit functions to memorize the address of the nonrecorded sections provided before a desired track is to be played. The control circuit functions to locate the pickup cartridge 3 at a desired address to play a desired track through the use of the addresses stored in the control circuit and the counter associated with the slit plate rotation sensor 15. When, for example, it is desired to play the second track, the tonearm 2 is driven to rotate to lower the pickup cartridge 3 at the address "0183", and the tonearm 2 is driven upward to separate the pickup cartridge 3 from the disc surface when the pickup cartridge 3 reaches the address "0250".

In this system, it is very important that the addresses of the pickup cartridge 3 and the nonrecorded section detection sensor 6 are correlated with respect to each other.

Figure 3:
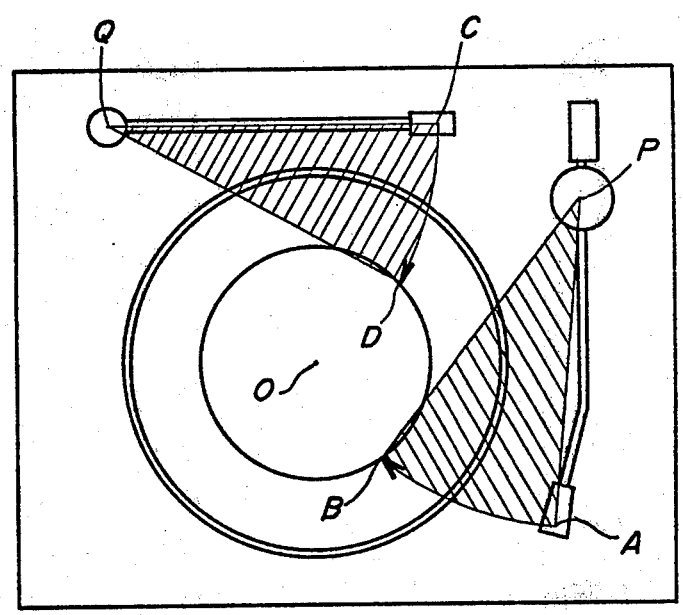
FIG. 3 is a plan view for explaining operation of the automatic record player of FIG. 1.

FIG. 3 shows the relationships between the tonearm 2 and the sensor arm 5.

Now assume that the tonearm is rotatable around a point P, and the sensor arm is rotatable around a point Q. It is most preferable that the points P and Q are spaced apart from a turntable center O by the same distance, that is $\overline{PO}=\overline{QO}$, and the actual lengths of the tonearm and the sensor arm are identical with each other, that is $\overline{PA}=\overline{QC}$.

However, in the actual system it is not preferable to satisfy the above requirement because the system becomes large. That is, in the actual system, it is preferable that $\overline{QC}<\overline{PA}$, and $\overline{QO}<\overline{PO}$.

The following is typical dimensions of the actual system.

$\overline{PA}=245$ mm,
$\overline{QC}=200$ mm,
$\overline{PO}=231$ mm,
$\overline{QO}=191$ mm.

To correlate the output signal indicating the tonearm rotation to the output signal indicating the sensor arm rotation, slits are formed in the slit plate 13 connected to the tonearm rotation shaft at a fixed given frequency, for example, 0.25° period, whereas slits are formed in the slit plate 12 connected to the sensor arm rotation shaft at a varying frequency.

The following is typical position angles of slits formed in the slit plates 12 and 13, respectively.

| SLIT ANGLE IN THE SLIT PLATE 13 CONNECTED TO THE TONEARM ROTATION SHAFT | SLIT ANGLE IN THE SLIT PLATE 12 CONNECTED TO THE SENSOR ARM ROTATION SHAFT 7 |
|---|---|
| 21.0000° | 25.1517° |
| 20.7500° | 24.8800° |
| 20.5000° | 24.6057° |
| 20.2500° | 24.3291° |
| 20.0000° | 24.0505° |
| 19.7500° | 23.7700° |
| 19.5000° | 23.4878° |
| 19.2500° | 23.2042° |
| . | . |
| . | . |
| . | . |
| 1.0000° | 1.2923° |
| 0.7500° | 0.9859° |
| 0.5000° | 0.6794° |
| 0.2500° | 0.3727° |

Figure 4:
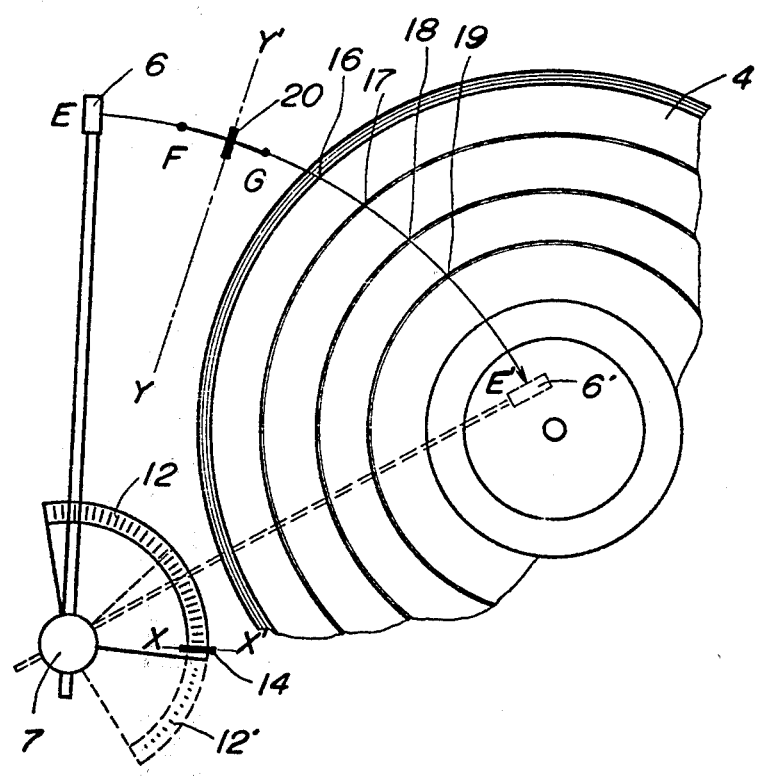
FIG. 4 is a plan view of an essential part of another embodiment of an automatic record player of the present invention.

In addition, absolute addresses of the pickup cartridge 3 and the nonrecorded section detection sensor 6 must be correlated to each other. FIG. 4 shows a system including an adjusting member for adjusting the address detected by the sensor 14. Like elements corresponding to those of FIGS. 1 and 2 are indicated by like numerals.

As is already discussed above, the nonrecorded section detection sensor 6 comprises the light emitting element and the light responsive element. The light responsive element receives a light beam emitted from the light emitting element and reflected at the disc surface when the nonrecorded section detection sensor 6 reaches nonrecorded sections 16, 17, 18 and 19. When the nonrecorded section detection sensor 6 is positioned above a track on which information is recorded, the light beam emitted from the light emitting element is scattered at the disc surface and, therefore, the light responsive element does not receive the light beam. When the light responsive element develops an output signal, the control circuit functions to memorize the address detected by the sensor 14 to store the address of the nonrecorded sections 16, 17, 18 and 19.

A reflection plate 20 is disposed in the course of travel EE' of the nonrecorded section detection sensor 6. The reflection plate 20 is positioned at a height identical with that of the disc surface so that the light responsive element receives the light beam when the nonrecorded section detection sensor 6 is located above the reflection plate 20. The reflection plate 20 is positioned at a region outside a disc mounted on the turntable 4, and is slidable along the travel course EE' in a range FG.

An output signal from the light responsive element, which is developed when the nonrecorded section detection sensor 6 reaches the reflection plate 20, is utilized to set an initial condition of the counter connected to the slit plate rotation sensor 14. The location of the reflection plate 20 is adjusted in a range between points F and G in such a manner that the contents of the counters connected to the rotation sensors 14 and 15 coincide with each other.

The invention being thus described, it will be obvious that the same may be varied in many ways. Such variations are not to be regarded as a departure from the spirit and scope of the invention, and all such modifications are intended to be included within the scope of the following claims.

What is claimed is:

1. An automatic record player comprising:
a tonearm;

a pickup cartridge mounted on a tonearm;

a first drive mechanism for rotating said tonearm to place said pickup cartridge at a desired position;

cartridge position detection means for detecting a current address of said pickup cartridge;

a nonrecorded section detection sensor for detecting a nonrecorded section provided between two adjacent tracks recorded on a disc;

a sensor arm for supporting said nonrecorded section detection sensor;

a second drive mechanism for rotating said sensor arm to scan the disc surface by said nonrecorded section detection sensor;

a nonrecorded section position information storing means for storing an address of said nonrecorded section detected by said nonrecorded section detection sensor; and adjusting means for adjusting the initial contents of said nonrecorded section position information storing means.

2. The automatic record player of claim 1, which further comprises means for correlating information related to said current address of said pickup cartridge to information related to said address of said nonrecorded section.

3. The automatic record player of claim 1, wherein said cartridge position detection means comprise:

a first slit plate fixed to a shaft around which said tonearm is rotatable; and means for detecting rotation of said first slit plate, and wherein said nonrecorded section position information storing means comprise:

a second slit plate fixed to a shaft around which said sensor arm is rotatable; and means for detecting rotation of said second slit plate.

4. The automatic record player of claim 3, wherein said tonearm is longer than said sensor arm.

5. The automatic record player of claim 4, wherein said first slit plate includes slits formed therein at a uniform distance, and said second slit plate includes slits formed therein at nonuniform distances.

6. The automatic record player of claim 1, wherein said nonrecorded section detection sensor comprises a light emitting element and a light responsive element.

7. The automatic record player of claim 6, wherein said adjusting means comprises a reflection plate positioned under the course of travel of said nonrecorded section detection sensor.

8. The automatic record player of claim 7, wherein said reflection plate is located at a height identical with that of a disc mounted on a turntable.

9. The automatic record player of claim 7, wherein said reflection plate is slidable along the course of travel of said sensor arm.

10. An automatic record player comprising:

a tonearm;

a pickup means mounted on the tonearm;

a first drive means for rotating said tonearm to place said pickup means at a desired position;

a nonrecorded section detection sensor for detecting a nonrecorded section provided between two adjacent tracks recorded on a disc;

a sensor arm for supporting said nonrecorded section detection sensor, said sensor arm being separate from said tonearm;

a second drive means for rotating said sensor arm to scan the disc surface by said nonrecorded section detection sensor, the rotation of said sensor arm being performed without regard to the rotation of said tonearm;

a cartridge position detection means for detecting a current address of said pickup means and a nonrecorded section position information storing means for storing an address of said nonrecorded section detected by said nonrecorded section detection sensor, said cartridge position detection means comprising a first slit plate fixed to a shaft around which said toner arm is rotatable and means for detecting rotation of said first slit plate and wherein said nonrecorded section position information storing means comprises a second slit plate fixed to a shaft around which said sensor arm is rotatable and means for detecting rotation of said second slit plate;

means for correlating information related to said current address of said pickup means to information related to said address of said nonrecorded section; and wherein said first slit plate includes slits formed therein at a uniform distance, and said second slit plate includes slits formed therein at non-uniform distances.

11. An automatic record player comprising:

a tonearm;

a pickup means mounted on the tonearm;

a first drive means for rotating said tonearm to place said pickup means at a desired position;

a nonrecorded section detection sensor for detecting a nonrecorded section provided between two adjacent tracks recorded on a disc;

a sensor arm for supporting said nonrecorded section detection sensor, said sensor arm being separate from said tonearm;

a sensor drive means for rotating said sensor arm to scan the disc surface by said nonrecorded section detection sensor, the rotation of said sensor arm being performed without regard to the rotation of said tonearm;

means for correlating information related to the current address of said pickup means to information related to the address of said nonrecorded; and adjusting means for adjusting the initial contents of said nonrecorded section position information storing means.

12. The automatic record player of claim 11 wherein said adjusting means comprises a reflection plate positioned under the course of travel of said nonrecorded section detection sensor.

13. The automatic record player of claim 12 wherein said reflection plate is located at a height substantially identical with that of a disc mounted on a turntable.

14. The automatic record player of claim 12 wherein said reflection plate is slidable along the course of travel of said sensor arm.

* * * * *